United States Patent

[11] 3,594,993

| [72] | Inventor | William T. Heyse |
| | | Windsor Locks, Conn. |
| [21] | Appl. No. | 593,649 |
| [22] | Filed | Nov. 14, 1966 |
| [45] | Patented | July 27, 1971 |
| [73] | Assignee | The Dexter Corporation |
| | | Windsor Locks, Conn. |

[54] POROUS, BONDED AND IMPREGNATED, NONWOVEN FILTER SHEET STRUCTURE
8 Claims, No Drawings

[52] U.S. Cl. ..................................................... 55/524,
55/527, 117/126, 161/170, 162/155, 162/156, 210/509
[51] Int. Cl. ....................................................... B01d 39/20,
B32b 5/16, D21h 5/18
[50] Field of Search ........................................ 55/Deg. 16,
522, 523, 524, 527; 117/126 GR; 210/483, 496, 504, 506, 508, 509, 510; 161/170; 162/129, 130, 145, 152, 153, 156, 164, 155; 156/327; 260/330.2, 33.4, 47; 252/8.1

[56] References Cited

UNITED STATES PATENTS

| 3,262,810 | 7/1966 | Campbell | 55/524 X |
| 3,306,875 | 2/1967 | Hay | 260/33.6 X |
| 3,409,581 | 11/1968 | Hagan | 117/126 X |

*Primary Examiner*—Robert F. Burnett
*Assistant Examiner*—William W. Schwarze
*Attorney*—Prutzman, Hayes, Kalb & Chilton

ABSTRACT: High efficiency particulate air filters having unusual resistance to high temperatures, hydrolytic environments and acidic conditions may be formed from an improved porous inorganic sheet structure comprised essentially of microglass fibers and a polyphenylene ether binder. Such sheets show no substantial decrease in strength characteristics after exposure to 300° C. for 10 minutes, a water repellency of about 30 inches (MIL–STD–282) or more and resistance to attack by even hydrofluoric acid.

POROUS, BONDED AND IMPREGNATED, NONWOVEN FILTER SHEET STRUCTURE

The present invention relates generally to fibrous, nonwoven sheet structures and is more particularly concerned with temperature and acid resistant inorganic fibered papers adapted for use as filter media in high efficiency particulate air filter systems and the like.

It is known that high efficiency filter systems must be designed to withstand not only normal operating conditions over prolonged periods of time but also short duration extremes in temperature, pressure and contaminants. For example, the exhaust filter systems for nuclear reactor facilities require the utilization of high efficiency particulate air filter banks designed for a possible reactor failure. Generally, the failure will be accompanied by the loss of coolant flow and the release of fissionable materials into the reactor building and through the exhaust system. Under such conditions it is essential that substantially all of the radioactive materials be trapped or filtered out of the air before it is exhausted into the atmosphere.

Similar filter systems may also be used in conjunction with facilities for reprocessing radioactive fuels. These facilities handle nuclear materials such as the highly volatile and extremely toxic plutonium hexafluoride which readily hydrolyzes to produce hydrofluoric acid. Accordingly, the filter media must be capable of withstanding not only the evolution of heated air and steam as well as unusual pressure surges but also dilute acidic conditions including in some instances dilute hydrofluoric acid and localized heating from entrapped radioactive particles. If only vapor, i.e., gas, reaches the filter bank and the temperature remains above the dew point the vapor will readily pass through the particulate air filter and any deleterious materials will be removed by an absorption train downstream from the filter bank. However, if the temperature of the filter media is below the dew point or moisture arrives at the filter in particulate form, i.e. as droplets, the filter will quickly "wet-out" and become partially or totally blinded, resulting in a failure of the filter media in the form of either a reduction in efficiency or a physical rupture, burst or tear.

Generally, the rate at which failure will occur depends upon the amount and type of water repellency associated with the filter media. Unbonded inorganic filter papers, such as those made exclusively of glass fibers, exhibit low dimensional integrity in a moisture laden atmosphere. Accordingly, in order to achieve a prolonged work life it is necessary to impart to the glass fiber paper some degree of water repellency associated with sufficient wet strength to retain its dimensional integrity. This is accomplished by treating the glass fiber filter papers with organic wet strength resin binders. Among these binders, the acrylic-type resins have been most widely employed due to their water and steam resistance. However, such papers tend to lose these desirable qualities after short exposure to temperatures of 300° C. and above. Utilization of silicone treated glass fiber papers in place of the acrylic treated materials improves water resistance at the elevated temperatures but tends to reduce the strength of the filter media causing premature burst at low pressure differentials. Additionally, neither the acrylic nor the silicone treated filter media are sufficiently resistant to attack by dilute hydrofluoric acid and accordingly result in failure when subjected to such conditions. Unfortunately, fibrous materials which might resist the acid atmosphere are unsuited for use due to their flammability, lack of mildew and steam resistance, and their lower efficiency (high pressure drop) at constant flow rate when compared with the glass fiber filter media.

Accordingly, it is a principal object of the present invention to provide an inorganic nonwoven sheet structure suitable for use as a high efficiency particulate air filter media, which sheet structure exhibits a longer effective life under normal operating conditions and improved resistance to failure under abnormal temperature, pressure, and other environmental conditions.

Another object of the present invention is to provide an inorganic filter paper exhibiting improved pressure, moisture and acid resistance, which properties are maintained after exposure to temperatures of 300° C. and higher.

Still another object of the present invention is to provide a nonwoven high efficiency particulate air filter media comprised of bonded inorganic fibers, the filter media being capable of withstanding exposure to temperatures in excess of 300° C. without degradation while at the same time exhibiting high wet strength, low moisture absorption, structural integrity in the presence of steam and strong and weak acids and bases over a wide temperature range, and substantial fire retardance.

A further object of the present invention is to provide an improved high porosity paper of the type described capable of being produced in accordance with conventional papermaking techniques in a rapid, facile, and economical manner, which paper is particularly well suited for utilization under high temperature and/or acid conditions such as in the exhaust systems of nuclear reactors and nuclear fuel reprocessing facilities.

Other objects will be in part obvious and in part pointed out more in detail hereinafter.

The invention accordingly comprises the article of manufacture possessing the features, properties, and the relation of elements, which are exemplified in the following detailed disclosure, and the scope of the application of which will be indicated in the claims.

The above and related objects are effectuated in accordance with the present invention by providing a fibrous nonwoven sheet material comprised essentially of inorganic fibers disposed in a random three dimensional network and retained as an integral sheet structure by both a physical interengagement between the fibers and a minor amount of a particular thermoplastic polyether binder material. The binder is preferably incorporated into the sheet structure by treating a preformed binderless inorganic fiber sheet with a solution of the thermoplastic polyether and subsequently removing the solvent from the treated sheet thereby leaving the binder deposited on the fibers without interfering with the porosity of the sheet. The paper thus produced is characterized by its ability to withstand exposure to temperatures in excess of 300° C. without degradation or substantial loss in the strength characteristics thereof.

The inorganic materials utilized in accordance with the present invention include substantially all of the inorganic materials commercially available in fiber form. For example, typical materials include glass, quartz, ceramics, asbestos, mineral wool, or suitable combinations thereof, all of which may be efficaciously employed. Generally, the fibers are capable of forming aqueous dispersions suitable for use on conventional papermaking machines. Thus, the fibers, as used, are preferably of papermaking length, that is, nominally greater than one one-hundredths inch in length and ranging to even more than 2 inches with a length to width ratio in excess of 20:1. As can be appreciated, the length employed will depend to a large degree upon the ability of the fibers to form the required aqueous slurry or fiber furnish. The fibers within the furnish are maintained in a substantially uniform state of dispersion prior to deposition on the sheet-forming wire so as to provide the most randomly oriented fiber network possible.

The fibers will vary substantially in thickness although when the end product is to be used as a high efficiency particulate air filter it is generally preferred that fibers having diameters of substantially less than 10 microns and preferably less than 5 microns predominate the fiber content of the furnish. In fact, for such applications the fibers, which have an average diameter of about 0.05 to 4.0 microns, constitute more than half the fiber content and preferably about 80 percent or more of the inorganic sheet structure. Some coarser fibers are also employed in minor amounts to provide a desirable reinforcing effect within the sheet. These may include glass rovings having a diameter of about 9.0 microns, asbestos, Teflon, polyethylene or other suitable coarser fibers. Among these, the rovings are preferred.

The sheet material is made in accordance with conventional papermaking techniques and preferably is a binderless nonwoven structure wherein the integrity of the sheet is maintained solely by the physical interengagement of the individual fibers as deposited on the web-forming wire of the papermaking machine. As is well known, the fibers are admixed and thoroughly dispersed in an aqueous medium by means of a paper mill, beater, or other mixing device. The resultant mixture, preferably at an acid pH for glass fibers, e.g. a pH of about 2—4, is then conveyed to the head box of a papermaking machine where it is further diluted and fed onto the continuous fiber accumulating paper-forming wire, such as a Fourdrinier wire. It will be appreciated, however, that minor amounts of micro organic fibers and/or conventional organic binders may be added at the wet end of the papermaking machine, albeit the preferred method contemplates the initial formation of a completely binderless sheet structure. Although substantially all commercial papermaking machines including the regular Fourdrinier or rotary cylinder machines may be used, it is desirable where very dilute fiber furnishes are employed to use an inclined fiber-collecting wire such as that described in U.S. Pat. No. 2,045,095 issued to F. H. Osborne on June 23, 1936. The fibers flowing from the head box are retained on the wire in a random three dimensional reticulate network or configuration with slight orientation in the machine direction while the aqueous dispersant quickly passes through the wire and is rapidly and effectively removed.

The binderless inorganic sheet structure, upon drying, is ready to be treated with a minor amount of the particular thermoplastic polyether binder, as mentioned hereinbefore. The binder is employed as a dilute organic solution which permeates, impregnates and saturates the inorganic sheet in such a manner as to thoroughly coat the individual fibers with a thin film of the binder solution. The solution is of a low viscosity so as to permit quick penetration of the sheet structure while not interfering with its porosity characteristics. The saturated sheet may then be dried in a conventional manner to drive off the solvent leaving the binder coated on the fibers. In accordance with the preferred embodiment the binder forms a continuous coating on only the individual fiber thereby imparting the desired hydrolytic strength and acid resistance without adversely affecting the porosity of the sheet structure. The resultant product generally contains less than 20 percent by weight binder with most sheets comprising about 2 to 8 percent by weight, the preferred binder concentration falling within the range of 3 to 5 percent by weight based on the total weight of the bonded sheet structure.

The binder used in accordance with the present invention is a high molecular weight thermoplastic poly(aromatic ether) obtained as the reaction product of oxidative polymerization carried out in the presence of a particular metal complex catalyst. More particularly, the binder is an organic polyoxide of the polyphenylene ether type. Such materials are conveniently produced by the oxidative polymerization of substituted phenols and exhibit physical and chemical properties which render them particularly advantageous for use as binders in high efficiency particulate air filter media. These binder materials are advantageously unaffected by aqueous media, exhibiting outstanding resistance to both aqueous chemicals and steam. Additionally, the polyphenylene ether-type materials possess a chemical inertness comparable to fluorocarbons and are capable of performing effectively under high temperature corrosive conditions, the plastic being substantially unaffected by strong and weak acids and bases over a wide temperature range.

The overall oxidation reaction for preparing the polyphenylene ethers is a reaction involving the hydrogen atom of the phenolic group of one phenol molecule, a hydrogen, chlorine, bromine or iodine substituent, preferably in the para position, of another phenol molecule and oxygen with the formation of water, according to the following schematic diagram:

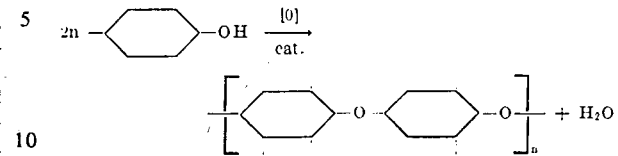

where $n$ is an integer having a value of at least 10 and preferably at least 100.

The general method of carrying out this oxidation process comprises reacting oxygen with one or more monohydric phenols in the presence of a tertiary amine and a cuprous salt soluble in the tertiary amine and capable of existing in the cupric state. The various polyphenylene ethers which may be utilized contain the repeating structural unit represented by the formula:

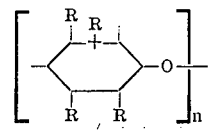

wherein the free valence of the terminal oxygen atom of one unit is connected to the free valence of the terminal phenylene nucleus of an adjoining unit, R is a monovalent substituent selected from the group consisting of hydrogen, halogen, hydrocarbon, halohydrocarbon, alkoxy and haloalkoxy radicals and $n$ is a positive integer as defined hereinbefore. The resins are thermoplastic having a heat deflection point of 375° F. at 264 p.s.i., an intrinsic viscosity up to 3.4 decil./g. (0.95 decil./g. material having a molecular weight of about 28,000) and excellent self-extinguishing flame characteristics. Mixed polyphenylene ethers of this same general type which possess the requisite temperature and acid resistance are also believed to be operable as binders in the present invention. However, at present the preferred materials are the polymers of ortho-substituted phenols, such as polyxylenol obtained by polymerizing 2,6-dimethyl phenol, sold as opaque or transparent grades under the trade name "PPO" by General Electric Company, Polymer Products Section, Pittsfield, Massachusetts.

As mentioned hereinbefore the polyphenylene ether binder is preferably utilized in the form of a dilute organic solution, the resin being soluble in halogenated hydrocarbons, such as chloroform, symmetrical tetrachloroethylene, dichloroethylene or the like, and in aromatic solvents such as pyridene, nitrobenzene or toluene. Although binder concentrations, in solution, as high as 4 to 5 percent by weight may be employed it is generally preferred to utilize a solution of about 1.0 to 2.5 percent by weight of the polyphenylene ether, the particular concentration utilized being dependent upon the manner in which the binder is to be applied to the preformed inorganic sheet structure. For example, a concentration of about 1.5 to 2.0 percent is quite satisfactory when dip-coating the sheet to produce a polyphenylene oxide concentration of about 4 to 5 percent by weight in the final product.

As mentioned hereinbefore, the sheet material thus produced in characterized by its ability to withstand exposure to high temperatures without substantial loss in its strength characteristics. More specifically, the papers of the present invention exhibit an average dry tensile breaking strength equal to or greater than 2.5 pounds per inch in the machine direction and 2.0 pounds per inch in the cross direction (TAPPI Standard 404–os–61) both before and after being subjected to temperatures as high as 300° C. for short periods of time. With regard to water repellency the papers tend to withstand a hydrostatic head substantially in excess of 10 inches without penetration and they are not severely weakened by 2 percent hydrofluoric acid for periods in excess of 24 hours. To evaluate the hydrofluoric acid resistance of the materials a small square of the paper is floated on a 2 percent acid solution for a set period of time, after which a visual examination of the paper is made.

The preferred inorganic filter papers of the present invention are of a medium to heavy weight, that is, they exhibit a basis weight of from 35 to 75 pounds per ream. However, the end use of the materials will more specifically dictate the weight of the paper and the invention should not be restricted to any specific weight range. The term "basis weight" as used herein refers to the weight in pounds of 480 sheets, each being 24 inches wide and 36 inches in length in accordance with TAPPI Test Method T410–os–61 or its related standard.

As indicated the papers of the present invention are particularly useful as high efficiency particulate air filter media and therefore find wide use in air circulation and exhaust systems for nuclear reactors, nuclear fuel reprocessing facilities, dust-free clean rooms and the like. Additionally, the durability of the papers under acid and alkaline conditions renders them useful in fields where such conditions prevail. For example, these papers may be employed as separators in pleated filter cartridges, batteries, fuel cells and the like. The papers can also be used as coalescing media in hot hydraulic fluid systems.

The following examples are given in order that the effectiveness of the present invention may be more fully understood. These examples are set forth for the purpose of illustration only and are not intended to in any way limit the practice of the invention. Unless otherwise specified all parts are given by weight.

EXAMPLE 1

A 50 pound microglass filter paper was formed on a papermaking machine from a fiber slurry comprising 60 percent Code AAA glass microfibers (0.5 to 0.75$\mu$ diameter), 35 percent Code A glass microfibers (1.6 to 2.6$\mu$ diameter), and 5 percent glass fiber rovings of 9 micron diameter. The unbonded glass paper obtained was dried and then saturated with a 2 percent toluene solution of polyxylenol (Grade 531–801–"PPO"—General Electric Co.). After drying on conventional drum driers the treated paper was found to exhibit a Frazier porosity of 4.3 c.f.m./ft.$^2$ at one-half inch water pressure differential, a basis weight of 50.3 pounds, a water repellency in excess of 36 inches in accordance with Method No. 603.1 of MIL–STD–282, a cross direction tensile strength of 3.8 pounds per inch and a cross direction elongation of 1.45 percent. Samples of the paper were then heated for 10 minutes at 300° C. and 400° C. in a muffle furnace. The tensile strengths after heat treatment were 4.3 and 3.0 pounds per inch respectively. Thus, the paper clearly evidences an ability to withstand exposure to temperatures of 300° C. and above without appreciable degradation. This is particularly significant in view of the fact that the binder melts well below these temperatures.

EXAMPLE 2

This example illustrates the improved properties of filter papers made in accordance with the present invention as compared to acrylic bonded papers heretofore used extensively for high efficiency particulate air filters.

Papers made from the same basic microglass composition as Example 1 were treated with different binders and their physical properties compared. The first paper was treated with a polyethyl acrylate binder while the second was saturated with polyphenylene oxide (Grade 631–111 "PPO"). A comparison of the properties exhibited by the two sheets is set forth in Table One.

From Table One it is clear that the polyphenylene oxide treated paper will not only withstand exposure to temperatures in excess of 300° C. without degradation but additionally shows superior burst and acid resistance properties.

EXAMPLE 3

This example illustrates the beneficial results obtained in accordance with the present invention when inorganic fibers other than glass are employed. Hand sheets were made from heat stabilized quartz fibers having an average fiber diameter from 0.5 to 0.75 microns in the same manner as set forth in Example 1. The hand sheets were saturated with dilute solutions of the resin indicated in Table Two and the properties of the resultant sheets were tested.

TABLE ONE

| Binder | Polyethyl acrylate | Polyphenylene ether |
|---|---|---|
| Basis weight (lbs./ream) | 58.0 | 51.4 |
| Gauge (in.) | .0164 | .0177 |
| Apparent density (g./cc.) | .236 | .205 |
| DOP penetration at 10.5 ft./min. (percent) | .018 | .010 |
| Pressure differential at 28 ft./min. (mm. of H$_2$O) | 96 | 94 |
| Frazier porosity (c.f.m./ft.$^2$) | 3.57 | 3.51 |
| Dry tensile strength at 70° F. (lbs./in.): | | |
|   Machine direction | 5.3 | 11.1 |
|   Cross direction | 2.6 | 4.4 |
| Dry tensile strength after 10 min. at 300° C. (lbs./in.): | | |
|   Machine direction | 1.6 | 9.9 |
|   Cross direction | 1.0 | 4.6 |
| Dry elongation at 70° F. (percent): | | |
|   Machine direction | 1.3 | 1.1 |
|   Cross direction | 1.8 | 1.0 |
| Binder content (percent) | 4.4 | 4.2 |
| Air burst (in. of H$_2$O): | | |
|   Dry | 36 | >40 |
|   Steamed | 20 | 28 |
|   Wet | 28 | 32 |
| HF resistance (2% sol.) | Slight | Excellent |
| Water repellency, (in.) | >30 | >30 |

TABLE TWO

| Binder | None | Polyphenylene ether | Poly n-butyl acrylate |
|---|---|---|---|
| Basis weight | 50±2 | 50±2 | 50±2 |
| DOP penetration at 10.5 ft./min. (%) | .008 | .001 | .009 |
| Pressure differential at 10.5 ft./min. (mm. of H$_2$O) | 38 | 43 | 36 |
| Average dry tensile (lbs./in.) | 0.85 | 4.0 | 1.6 |
| Average dry elongation (percent) | 5.2 | 1.1 | 3.2 |
| Water repellency | 0 | 28 | 25 |
| Air burst (in. of H$_2$O): | | | |
|   Dry | 9 | 21 | 17 |
|   Steamed | 8 | 20 | 16 |
| HF resistance (2% sol.) | (1) | (2) | (1) |

[1] Completely dissolved.
[2] Resistant.

As can be seen the polyphenylene oxide treated material shows substantially greater strength characteristics in both dry and moist atmospheres. After exposure to HF for 48 hours the untreated and acrylate treated sheets had completely dissolved leaving the HF solution clear while the polyphenylene treated sheet was still intact, albeit somewhat softened by the exposure. Additionally, the polyphenylene oxide showed no substantial loss in strength after exposure to air at 300° C.

EXAMPLE 4

This example illustrates the substantial corrosion and fire resistant properties exhibited by air filter separators made in accordance with the present invention.

A hand sheet was prepared from a fiber furnish of 40 percent crocidolite asbestos, 50 percent chrysolite asbestos and 10 percent abaca fibers. The sheet was saturated with a 4 percent solution of polyphenylene oxide (Grade 531–801– "PPO"—General Electric Co.) resulting in a binder content of approximately 5 percent by weight retained within the sheet. The product had a basis weight of 72 pounds and a Frazier porosity considerably less than 1 c.f.m./ft.$^2$ at one-half inch pressure drop.

In accordance with the Oak Ridge National Laboratory Preliminary Standard AR-2.01 samples of the sheet were tested for stiffness after soaking in water for 24 hours and after immersion in certain acidic and basic reagents for 2 minutes followed by a 24 hour water soak. The acids employed were hydrofluoric acid at 10 percent concentration, sulfuric acid at 9 Molar concentration and nitric acid at 7.5 Molar concentration while the basic reagent was a 50 percent solution of sodium hydroxide. Essentially no difference was observed in the wet rigidity of the samples with or without the 2 minute reagent treatment.

Samples of the sheet were held in an open flame and then removed. While in the flame the product did not burn although a slight increase in the size of the flame was noted, except in the sulfuric acid treated material. Upon removing the material from the flame all sheets were self-extinguishing.

These results establish the beneficial characteristics of the sheet products of the present invention as filter separators, particularly since materials utilized heretofore have exhibited either low corrosion, moisture or combustion resistance.

As will be apparent to persons skilled in the art, various modifications and adaptations of the papers above-described will become readily apparent without departure from the spirit and scope of the invention, the scope of which is defined in the appended claims.

The embodiments of the invention in which an exclusive property or privilege I claim are defined as follows:

1. In a porous bonded nonwoven sheet structure for use in a high efficiency filter system wherein the fiber content comprises substantially inorganic fibers disposed in a random three dimensionally interengaged network and the binder is an organic material comprising less than 20 percent by weight of the sheet structure, the improvement wherein the binder is an impregnant comprised essentially of a thermoplastic aromatic ether polycondensate of high molecular weight forming a thin-film coating on at least the exposed fibers of the sheet structure and the bonded sheet is characterized by the retention of substantial tensile strength after exposure to 300° C. and by its substantial resistance to attach under acidic conditions including dilute hydrofluoric acid solutions.

2. A sheet structure as set forth in claim 1 wherein the inorganic fibers are predominantly microfibers having an average diameter of about 0.05 to 4.0 microns, the sheet exhibiting a water repellency according to MIL-STD-282 exceeding a hydrostatic head of 10 inches prior to penetration.

3. A sheet structure as set forth in claim 1 wherein the binder is a thermoplastic polyphenylene ether resin.

4. An inorganic sheet structure as set forth in claim 2 wherein the binder consists of 2 to 8 percent by weight based on the total weight of the sheet structure.

5. The sheet structure of claim 4 wherein the inorganic fibers are glass and consist predominantly of fibers having an average diameter of 0.05 to 4.0 microns, said sheet having tensile breaking strengths greater than 2.5 pounds per inch in the machine direction and greater than 2.0 pounds per inch in the cross direction both before and after exposure to a temperature of about 300° C.

6. The porous sheet structure of claim 3 particularly well suited as a filter medium wherein the polyphenylene ether resin binder consists of polyxylenol and constitutes about 3 to 5 percent by weight of the sheet structure.

7. The sheet structure of claim 6 wherein about 80 percent by weight of the inorganic fibers are glass having an average diameter less than 5 microns and about 20 percent by weight are reinforcing fibers of about 9 micron diameter or larger.

8. The sheet structure of claim 3 particularly well suited as a separator wherein the inorganic fibers are predominantly asbestos.